United States Patent [19]

Hume et al.

[11] Patent Number: 5,102,684
[45] Date of Patent: Apr. 7, 1992

[54] KOALA FEEDSTUFF

[75] Inventors: Ian D. Hume, Gordon; Lester I. Pahl, Brisbane, both of Australia

[73] Assignees: The University of Sydney, Australia; N.Y. Zoological Society, New York, N.Y.

[21] Appl. No.: 574,366

[22] Filed: Aug. 28, 1990

Related U.S. Application Data

[62] Division of Ser. No. 308,132, Feb. 8, 1989, Pat. No. 4,952,418.

[30] Foreign Application Priority Data

Feb. 9, 1988 [AU] Australia ............................ PI 6650

[51] Int. Cl.⁵ ................................................ A23K 1/00
[52] U.S. Cl. .................................... 426/636; 426/635; 426/517; 426/518; 426/634; 426/548; 426/655; 426/658
[58] Field of Search ............... 426/635, 636, 548, 655, 426/634, 517, 518, 658

[56] References Cited

U.S. PATENT DOCUMENTS 3,288,614 11/1966 Miles .................................... 426/598
4,389,425 6/1983 Burr ..................................... 426/598

OTHER PUBLICATIONS

Cork et al., "Digestion & Metabolism of a Natural Foliara Diet Eucalyptus-Punctata" File 5 (1983) Dialog Abstract No. 0014236560.
Ullrey et al., "Composition of Preferred & Rejected Eucalyptus Browse Offered to Captive Koalas" File 53 (1981) Dialog Abst. No. 1402282.
Southwell "The Koala—Addicted to Eucalyptus Oil?" File 53 (1978) Dialog Abstract No. 1305287.
Morrison "Feeds and Feeding" Morrison Publishing Co. 22nd Edition (1957) pp. 202-203 and 303-304.

Primary Examiner—R. B. Penland
Attorney, Agent, or Firm—Ostrolenk, Faber, Gerb & Soffen

[57] ABSTRACT

Koalas are natives of Australia and are one of the few mammals whose diet consists almost exclusively of the leaves of native eucalypt trees. The present invention provides a method of preparing a feedstuff for koalas.

11 Claims, No Drawings

KOALA FEEDSTUFF

This is a division of U.S. patent application Ser. No. 308,132, filed Feb. 8, 1989, U.S. Pat. No. 4,952,418.

FIELD OF THE INVENTION

The present invention relates to a replacement feedstuff for koalas suitable for replacing at least in part the koala's natural diet of eucalypt leaves.

BACKGROUND OF THE INVENTION

It is well known that koalas have extremely specialised feeding habits. Koalas are natives of Australia and are one of the few mammals whose diet consists almost exclusively of the leaves of native eucalypt trees. Eucalyptus trees contain eucalypt oils which are toxic to most animal species. Koalas have a metabolism which is adapted to cope with these toxins.

However, koalas from a given area feed almost exclusively on a diet made up of only a very limited number of Eucalyptus species. This specialised feeding behaviour makes it very difficult to successfully keep koalas in zoos, particularly where the required Eucalyptus species are not freely available. In practice, it is necessary to give the animals fresh leaves each day.

SUMMARY OF THE INVENTION

One aspect of the present invention provides a feedstuff for feeding koalas which comprises water, ground forage, a binding agent, a sweetener, a lactose-free milk substitute, and either eucalypt leaf or an equivalent amount of eucalypt oil extract.

A second aspect of the invention provides a liquid dip composition for use in conjunction with the replacement feedstuff. The liquid dip composition comprises a lactose-free milk substitute, water, a sweetener, and either eucalypt leaf or an equivalent amount of eucalypt oil extract.

In a third aspect of the invention there is provided a method of preparing a feedstuff for koalas comprising the steps of:
(a) dissolving a binding agent in water,
(b) adding ground forage, a sweetener, a lactose-free milk substitute, a ground eucalypt leaf or an equivalent amount of eucalyptus oil extract,
(c) mixing,
(d) rolling the mixture to form a sheet, and
(e) cutting the sheet into portions.

PREFERRED FEATURES OF THE INVENTION

The feedstuff in accordance with the first aspect of the invention comprises:
60 to 70 wt % water,
10 to 15 wt % ground forage,
5 to 10 wt % binding agent,
0 to 5 wt % sweetener,
5 to 10 wt % lactose-free milk substitute, and either
8 to 12 wt % ground or chopped eucalypt leaf or an equivalent amount of eucalypt oil extract.

Although the feedstuff could be in particulate form, it is preferred to be in the form of a shaped solid, such as a biscuit.

The feedstuff preferably comprises 65 to 70 wt % water.

The ground forage may be ground oaten hay or ground dried grass, but is preferably ground lucerne (alfalfa) hay.

The function of the binding agent is to bind together the various ingredients and to absorb water. Agar and gelatine are preferred binding agents. Other edible, water-soluble binding agents would readily occur to the person skilled in the art.

The presence of the sweetener is not essential but is preferred in order to improve the palatability of the feedstuff. The sweetner is preferably sucrose or other sugar, or an artificial sweetner such as saccharin or aspartame.

The milk substitute should be lactose-free, since koalas do not have an enzyme capable of digesting lactose, and it provides a suitable source of protein, minerals and vitamins. The milk substitute may be in the form of a suitable composition comprising isolated protein, vegetable oils, minerals, and vitamins, and may be derived from soya beans. A suitable milk substitute is Prosobee powder (Prosobee is a trade mark of Mead Johnson).

The ground eucalypt leaf content may be made up of a balanced mixture of Eucalyptus species appropriate to the particular koala population. For example, a preferred mixture of species for koalas from the New England area of Australia would be *Eucalyptus viminalis, E. nova-anglica, E. nicholii* and *E. blakelyi.*

In the region of Sydney, Australia the staple diet consists of *E. punctata. E. tereticornis,* and *E. microcorys.*

In the region of Victoria, Australia the staple species include *E. viminalis. E. ovata* and *E. camaldulensis.*

In Queensland, Australia the staple species include *E. camaldulensis, E. tereticornis, E. crebra* and *E. populnea.*

Feedstuffs for koalas from these regions would generally include these staple species, although the koalas also tolerate minor amounts of additional species. It is also possible that each batch of feedstuff (e.g. biscuit) would contain a single eucalypt species, the koala being fed an appropriate mixture of different single-species batches. This would depend on the preferences shown by the animals.

It is possible to replace the ground eucalypt leaf content with an equivalent amount of eucalypt oil extract such that the content of eucalypt oils in the feedstuff is the same. The oil extract may be a mixture of oils from different eucalypts with the oil being prepared from leaves of the staple food species, for example by steam distillation. The leaf may be substituted partially or completely by the oil extract. When oil is used, the abovementioned weight percentages of the other constituents will have to be varied accordingly.

In order to improve the palatability of the feedstuff, it may, at least initially, be desirable to feed it in conjunction with a liquid dip composition comprising:
40 to 75 wt % lactose-free milk substitute,
25 to 40 wt % water,
0 to 6 wt % sweetener, and
6 to 13 wt % ground eucalypt leaf or the equivalent amount of eucalypt oil extract.

It will usually be necessary to wean the koalas gradually off a diet of wholly fresh eucalypt leaves onto the substitute feedstuff, and this may be done by feeding with increasing proportions of the feedstuff optionally with the dip over a prolonged period.

It has been found that the feedstuff according to the invention has a relatively short shelf-life. It is therefore recommended that the feedstuff be stored frozen (for up to three months) or preferably prepared fresh every second day. The feedstuff is therefore adapted to be prepared on site, close to the time of use.

We have found that the preparation and feeding of the feedstuff and liquid dip composition of the invention can readily be incorporated into the daily routine of a koala keeper.

The invention will now be illustrated by way of reference only to the following non-limiting examples.

DETAILED DESCRIPTION OF THE INVENTION

EXAMPLE 1

Biscuit Formulation

The following ingredients were mixed together;
63.6 wt % water,
12.7 wt % ground lucerne,
5.5 wt % agar,
1.8 wt % sucrose
7.3 wt % lactose-free milk substitute, e.g. Prosobee, and
9.1 wt % chopped eucalyptus leaf.

The agar was mixed with the water just below boiling point, then the rest of the mixture was added and the mixture pressed or rolled flat, then cut into biscuits.

EXAMPLE 2

Biscuit Formulation with Fresh Eucalypt Leaf

In a second experiment, the following ingredients were mixed together:
400 ml water,
60 g ground lucerne,
38 g agar,
20 g sucrose,
40 g lactose-free milk substitute, e.g. Prosobee, and
50 g chopped eucalypt leaf.

Biscuits were prepared from this mixture, as in Example 1.

EXAMPLE 3

Biscuit Formulation with Extracts of Mixed Eucalypt Oils 425 ml water,
88 g ground lucerne,
38 g agar,
20 g sucrose,
40 g lactose-free substitute, e.g. Prosobee, and
0.6 ml steam-distilled mixed eucalypt oils.

EXAMPLE 4

Dip Composition with Fresh Eucalypt Leaf

A liquid dip composition was made up as follows:
210 g lactose-free milk substitute, e.g. Prosobee,
290 ml water,
40 g sucrose, and
40 g ground eucalyptus leaf.

The dip composition was optionally used together with the biscuits when feeding the koalas.

EXAMPLE 5

Dip Composition with Extract of Mixed Eucalypt Oils

A second liquid dip composition was made up as follows:
290 ml water,
40 g sucrose,
210 g lactose-free milk substitute, e.g. Prosobee, and
0.6 ml steam-distilled mixed eucalypt oils.

The dip composition was used as in Example 4.

EXAMPLE 6

Preparation of Feedstuff

Due to the relatively short shelf-life (approx 24 hrs) it is preferable to prepare the feedstuff fresh every second day. To this end the feedstuff can be supplied in three components.

Component A (Dry in Platic Bag)

88 g ground lucerne,
20 g sucrose, and
40 g lactose-free milk substitute, e.g. Prosobee.

Component B (Dry in Plastic Bag)

38 g agar.

Component C (Preferably in Capsules)

0.6 ml steam-distilled mixed eucalypt oils.

The prepared feedstuff component B was firstly dissolved in 425ml water heated to a temperature just below boiling point. Components A and C were then mixed in thoroughly. The mixture is then poured onto a plastic sheet on a flat surface, a second plastic sheet placed on top, and the mixture rolled while still hot to a thickness of 2-3 mm. When cooled and set, the feedstuff was cut into portions approximately 2.5 cm × 8 cm. Suitably, the portions are biscuit-like. If fresh eucalypt leaf is available, component C can be replaced by 50 g of chopped leaf, and the volume of water reduced from 425 ml to 400 ml.

EXAMPLE 7

Feeding of Koalas

Biscuits formulated as in Example 1 or Example 2, and preferably prepared as in Example 5, were fed by hand to koalas. The biscuits may optionally first be dipped in a dip formulation as set out in Example 3 or 4, depending on the preferences of individual animals.

It will be clearly understood that the invention in its general aspects is not limited to the specific details referred to hereinabove.

We claim:

1. A method of preparing a feedstuff for koalas, comprising the steps of:
   a) dissolving 5 to 10 wt. % binding agent in 60 to 70 wt. % water,
   b) adding 10 to 15 wt. % ground forage, 0 to 5 wt. % sweetener, 5 to 10 wt. % lactose-free milk substitute, and 8 to 12 wt. % ground or chopped eucalypt leaf or an equivalent amount of eucalyptus oil extract,
   c) mixing,
   d) rolling the mixture to form a sheet, and
   e) cutting the sheet into portions.

2. A method according to claim 1, wherein the ground forage is selected from the group consisting of oaten hay, ground dried grass or ground lucerne (alfalfa) hay.

3. A method according to claim 1, wherein the binding agent is selected from the group consisting of agar and gelatine, and the water is hot water.

4. A method according to claim 1, wherein the sweetener is a sugar.

5. A method according to claim 4, wherein the sweetener is sucrose.

6. A method according to claim 1, wherein the sweetener is an artifical sweetener.

7. A method according to claim 6, wherein the sweetener is saccharin or aspartame.

8. A method according to claim 1, wherein the milk substitute is a lactose-free composition comprising isolated protein, vegetable oils, minerals and vitamins.

9. A method according to claim 1, wherein the milk substitute is derived from soya beans.

10. A method according to claim 1, wherein the ground eucalypt leaf component comprises leaves of one or more species selected from the group consisting of *Eucalyptus viminalis, E. nova-anglica, E. nicholii, E. blakelyi, E. punctata, E. tereticornis, E. microcorys, E. ovata, E. camaldulensis, E. crebra* and *E. populnea*.

11. A method according to claim 1, wherein the eucalypt oil extract comprises a mixture of eucalypt oils derived from species as claimed in claim 10.

* * * * *